United States Patent
Miura (10) Patent No.: US 6,643,363 B1
(45) Date of Patent: Nov. 4, 2003

(54) TELEPHONE NUMBER RELOCATION GUIDANCE SYSTEM

(76) Inventor: Noboru Miura, Desans Fuchinobe 302, 4-39-25, Fuchinobe, Sagamihara, Kanagawa (JP), 229-0006

( * ) Notice: Subject to any disclaimer, the term of this patent is extended or adjusted under 35 U.S.C. 154(b) by 588 days.

(21) Appl. No.: 09/666,015

(22) Filed: Sep. 19, 2000

(30) Foreign Application Priority Data

Sep. 22, 1999 (JP) ............................................. 11-268548

(51) Int. Cl.⁷ .......................... H04M 3/42; H04M 7/00; H04L 12/16; H04L 12/28; G06F 17/30
(52) U.S. Cl. .................. 379/201.02; 370/259; 370/901; 379/221.13; 379/900; 379/218.01; 707/10; 707/100; 709/201
(58) Field of Search ................................. 370/259, 901; 379/201.01, 201.02, 218.01, 221.13, 900, 903; 707/1, 10, 100, 102, 104.1; 709/201

(56) References Cited

U.S. PATENT DOCUMENTS 6,105,024 A * 8/2000 Graefe et al. .................. 707/7
6,134,316 A * 10/2000 Kallioniemi et al. .. 379/220.01
6,195,417 B1 * 2/2001 Dans .......................... 379/67.1
6,266,405 B1 * 7/2001 Madour et al. ......... 379/220.01
6,304,647 B1 * 10/2001 Frost ..................... 379/201.12
6,373,940 B2 * 4/2002 Shaffer et al. ......... 379/355.02
6,438,223 B1 * 8/2002 Eskafi et al. ........... 379/221.13
6,473,781 B1 * 10/2002 Skagerwall et al. ........ 709/201

* cited by examiner

Primary Examiner—Harry S. Hong
(74) Attorney, Agent, or Firm—Brown & Michaels, PC (57) ABSTRACT

A telephone number relocation guidance system that consists of a server (3) on the Internet (1) and terminal (2). The terminal (2) comes with input method that allows users to enter their information such as telephone number and etc, and display method to display the telephone number and other information, from the server (3). The server (3) has a database stored with numerous records of old telephone numbers and its corresponding new telephone number, and owner of the telephone and the processing unit sending the searched information of the old telephone number and its corresponding new telephone number entry from the terminal (2) and coming from the database.

19 Claims, 13 Drawing Sheets

| | Owner Name | New Telephone Number | Old Telephone Number | Password | Note |
|---|---|---|---|---|---|
| 41 | A | 2 2 2 | 1 1 1 | A B C | Moved to the United States |
| 41 | B | 3 3 3 | 1 1 1 | X Y Z | Changed to mobile phone |
| | ⋮ | ⋮ | ⋮ | ⋮ | ⋮ |

| Owner Name | New Telephone Number | Old Telephone Number | Password | Note |
|---|---|---|---|---|
| A | 222 | 111 | ABC | Moved to the United States |
| B | 333 | 111 | XYZ | Changed to mobile phone |
| ... | ... | ... | ... | ... |

```
*************************
Search Result (Two people are registered for 111)

Name: User A
   New Number: 222
   Note: Moved to the United States

Name: User B
   New Number: 333
   Note: Changed to mobile phone

Please judge the right number according to the name
or note.
```

TELEPHONE NUMBER RELOCATION GUIDANCE SYSTEM

BACKGROUND OF THE INVENTION

1. Field of the Invention

The invention pertains to the field of data processing systems. More particularly, the invention pertains to systems and methods for providing information regarding changes in telephone numbers to the public over a global information network.

2. Description of Related Art

Currently, NTT (Nippon Telegraph And Telephone Corporation) provides a telephone number relocation guidance service. If the telephone number is changed and the user applies for a relocation guidance service with NTT, a voice guidance of the new telephone number corresponding to the previous one is announced when a caller calls the old telephone number.

The existing relocation guidance service is available only for the specified period since the old telephone number is reassigned to another user. If a caller calls the old telephone number after a specified period, the caller may hear an announcement that "This line is no longer in use" or the caller may even call the new user, which creates a wrong number problem.

The relocation guidance service is only provided for land telephone circuits of NTT and is not available for mobile phone, PHS, and pagers which telephone numbers are changed more frequently. Since there are many operators of mobile phone and PHS, it is very difficult for one customer center to operate a telephone number relocation guidance server uniformly. In addition, it is impossible to cover international telephone numbers.

It is time consuming work to provide the telephone relocation guidance service because NTT has to enter both old telephone number and new telephone number in their database.

This invention corrects the inconveniences of the existing system. The objective of the invention focuses on unlimited availability of the telephone number relocation guidance service. It covers not only the land telephone circuit but also many other telephone terminals such as mobile phone, PHS, and pagers and provides several telephone relocation guidance services uniformly. The objective not only targeted toward domestic telephone number relocation but also international telephone number relocation guidance can be provided uniformly.

It will also be understood that although the invention is described in terms of the NTT, that it will also be applicable to other telephone and communications systems worldwide.

SUMMARY OF THE INVENTION

This invention is related to a telephone number relocation guidance system, which is related to all telephone number relocation information systems including mobile telephones both domestically and internationally. The telephone number reallocation guidance system of the invention consists of a server connecting with a terminal on the Internet. The terminal inputs information such as telephone number, and the server will then send information to the terminal such as the old telephone numbers and its corresponding new telephone number and the owner name of these telephone numbers. The information is stored in a database that stores multiple records. The server also has a processing unit that searches old telephone numbers input from the terminal and its corresponding new telephone number and owner name from the database and sends the searched information to the terminal. The display incorporates a Web (World Wide Web) browser.

DETAILED DESCRIPTION OF THE INVENTION

For this invention, if an old telephone number is input from the terminal using an input method, the processing unit of the server searches the corresponding record of the old telephone number from the database and returns the new telephone number and its owner name registered as a record to the terminal. The terminal receiving this information displays the old telephone number and its corresponding new telephone number and owner name on the screen of the terminal. The user of this system can confirm the new telephone number after relocation. In addition, the user can confirm the owner name of the searched telephone number.

For instance, let us assume that User A changed their telephone number from 111 to 222 and User B acquired the telephone number 111 and User B changed this number from 111 to 333. If a user searches 111 as the old telephone number, they can find both 222 and 333 as a new telephone number on the search result menu. Since each telephone number appears with its owner name, the appropriate telephone number can be found. This service can be provided without limitation and the required information can be searched conclusively.

The processing unit of the server accepts the old telephone number and its corresponding new telephone number and owner name of these numbers and registers these information as records to the database. This invention allows the user to register the modified telephone number on their own so that the registration workload of the database is reduced.

Since this system includes password settings when the telephone number information is registered, it is possible to authenticate the user who requesting for such operation. It is possible for the user to leave a message with this system, for instance why the telephone number was changed, etc.

If a user inputs the new telephone number and its password from the terminal when the telephone number relocation information record is registered, the server searches the record to be updated and sends the results to the terminal. The information of the record appears on the display. The user recognizes their current registered record on the server according to the displayed information and inputs the update information. The entered update data is sent to the server. The server updates the target records with the update data received.

Figure 1:
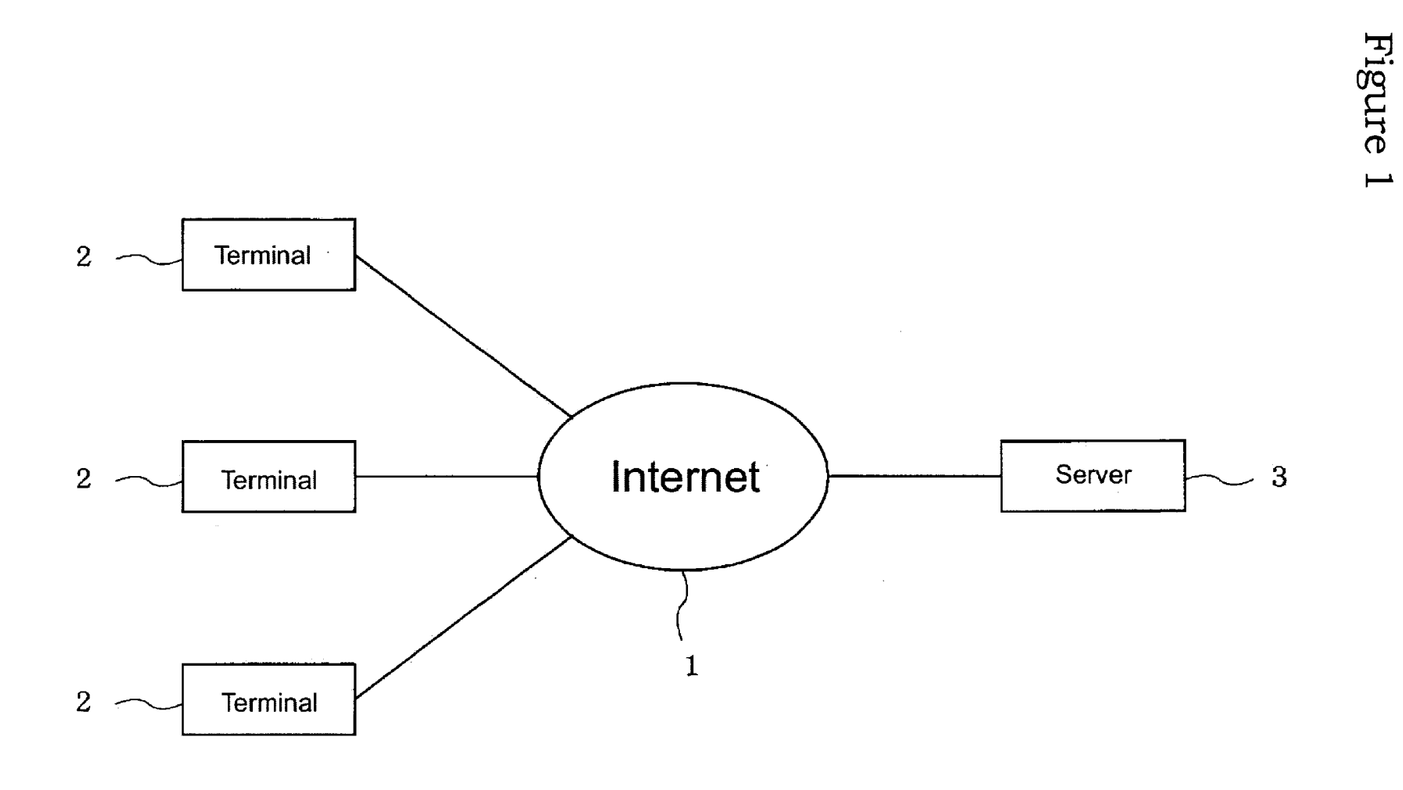
FIG. 1 shows an overview of the telephone number guidance system configuration regarding this invention

FIG. 1 is the entire chart of the system. Multiple terminals (2) and a server (3) are configured. Each terminal (2) is owned by a respective user and is connected to a global computer network (hereafter simply, "the Internet") (1) by ground or wireless. In addition, the terminal (2) includes any type of terminal devices and mobile phones that can connect to the Internet.

Figure 2:
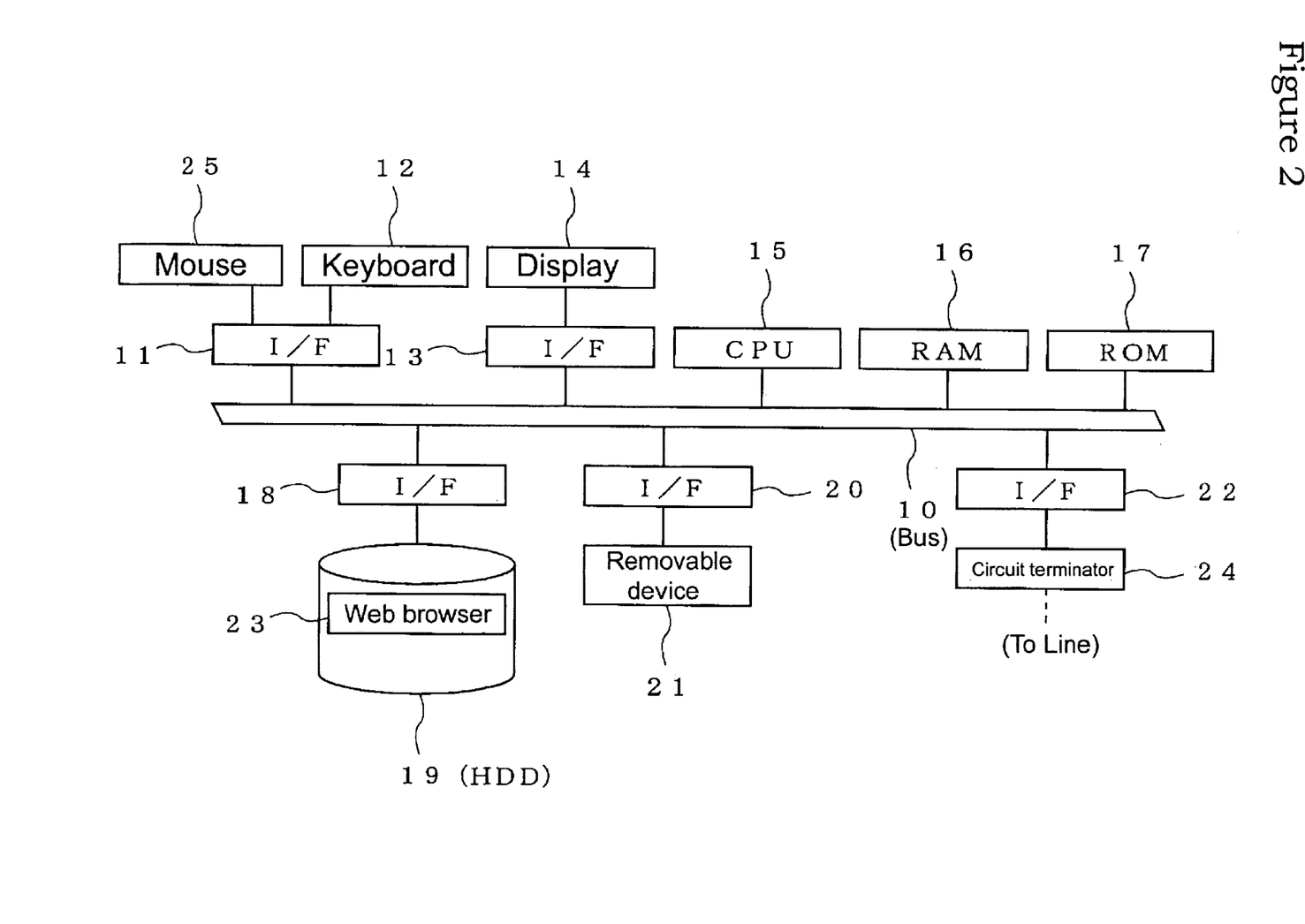
FIG. 2 shows a block diagram of the terminal configuration shown in FIG. 1

FIG. 2 is a configuration example of the terminal (2). The keyboard (12) and mouse (25) are used as data entry methods, display (14) as a display measure, CPU (15), RAM (16), ROM (17), hard disk drive (HDD) (19), removable devices (21) such as CD-ROM drive and FD drive, and circuit terminator (24) such as modem or terminal adapter are connected to bus (10). Symbol numbers 11, 13, 18, 20, 22 represent the interface of respective devices. Web browser (23) and control software of the circuit terminator (24) are stored on the HDD(19). The CPU (15) connects to the Internet via the circuit terminator (24) by reading and executing the specified software program stored on the HDD (19) in the RAM (16), then connect to the server (3) to start the Web browser (23), display the file and information from the server (3) on the display (14) with Web browser, accept the specified entry from the keyboard (12) according to the file sent from the server (3), then send an entry information to the server (3).

Figure 3:
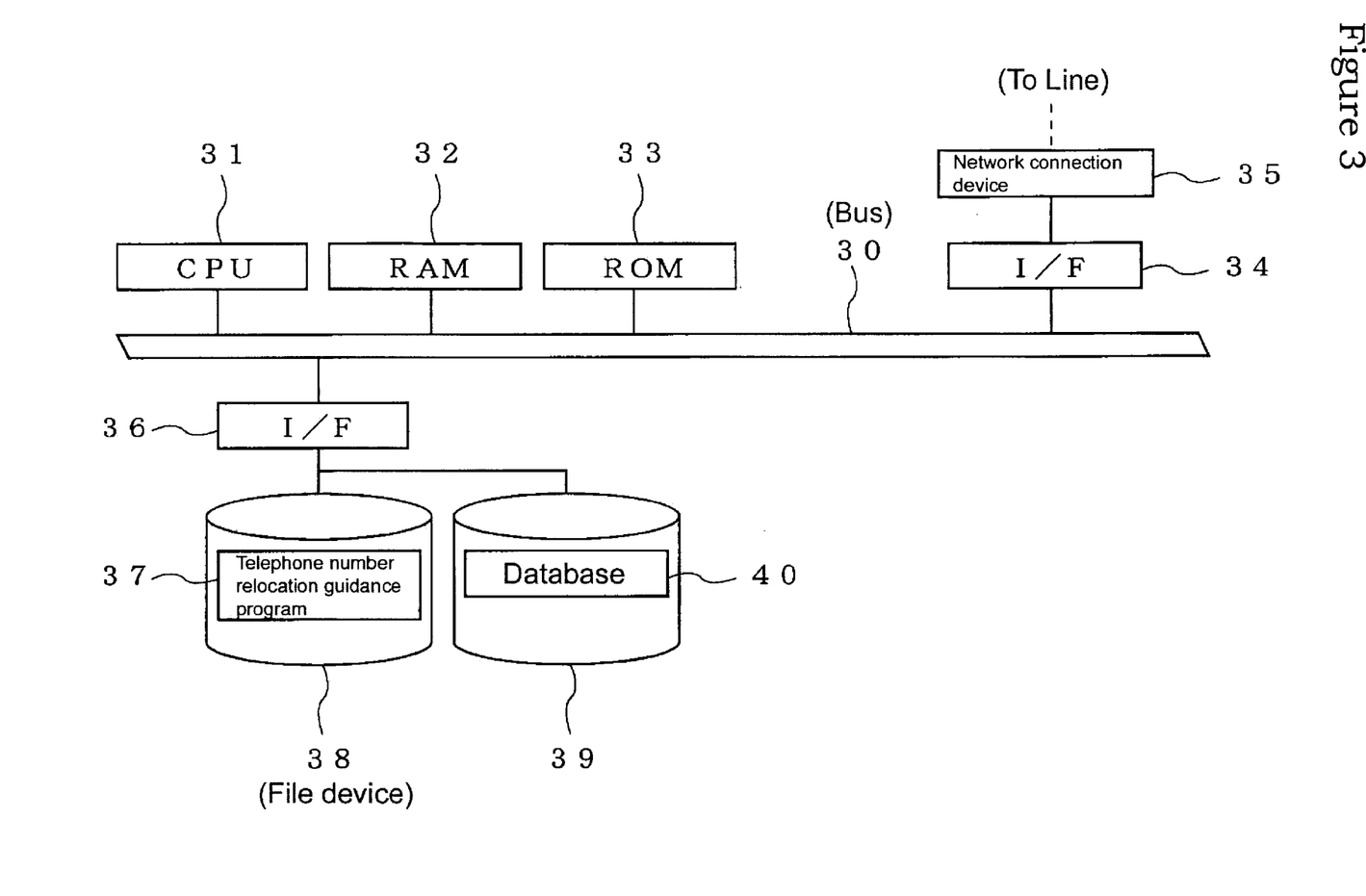
FIG. 3 shows a block diagram of the server configuration shown in FIG. 1

FIG. 3 is a system configuration of the server (3). The CPU (31), RAM (32), ROM (33), network connection device (35) and file device (38 and 40) are connected by Bus (30). Symbol numbers 34 and 36 represent the interface of respective devices. The file devices (38 and 40) do not have to be a single device or multiple device but the telephone number relocation program (37) and database (39) should be stored. Therefore, the file device (38) is a computer readable media that stores the telephone number relocation program. The CPU (31) accesses the database (39) and exchanges information with the terminal (2) by reading the telephone number relocation program (37) in the RAM (32). For instance, an Active-Server-Page (ASP) can be used as a telephone number relocation program. The network device (35) is a terminal adapter or ISDN router used to connect to the leased circuit to the Internet.

Figure 4:
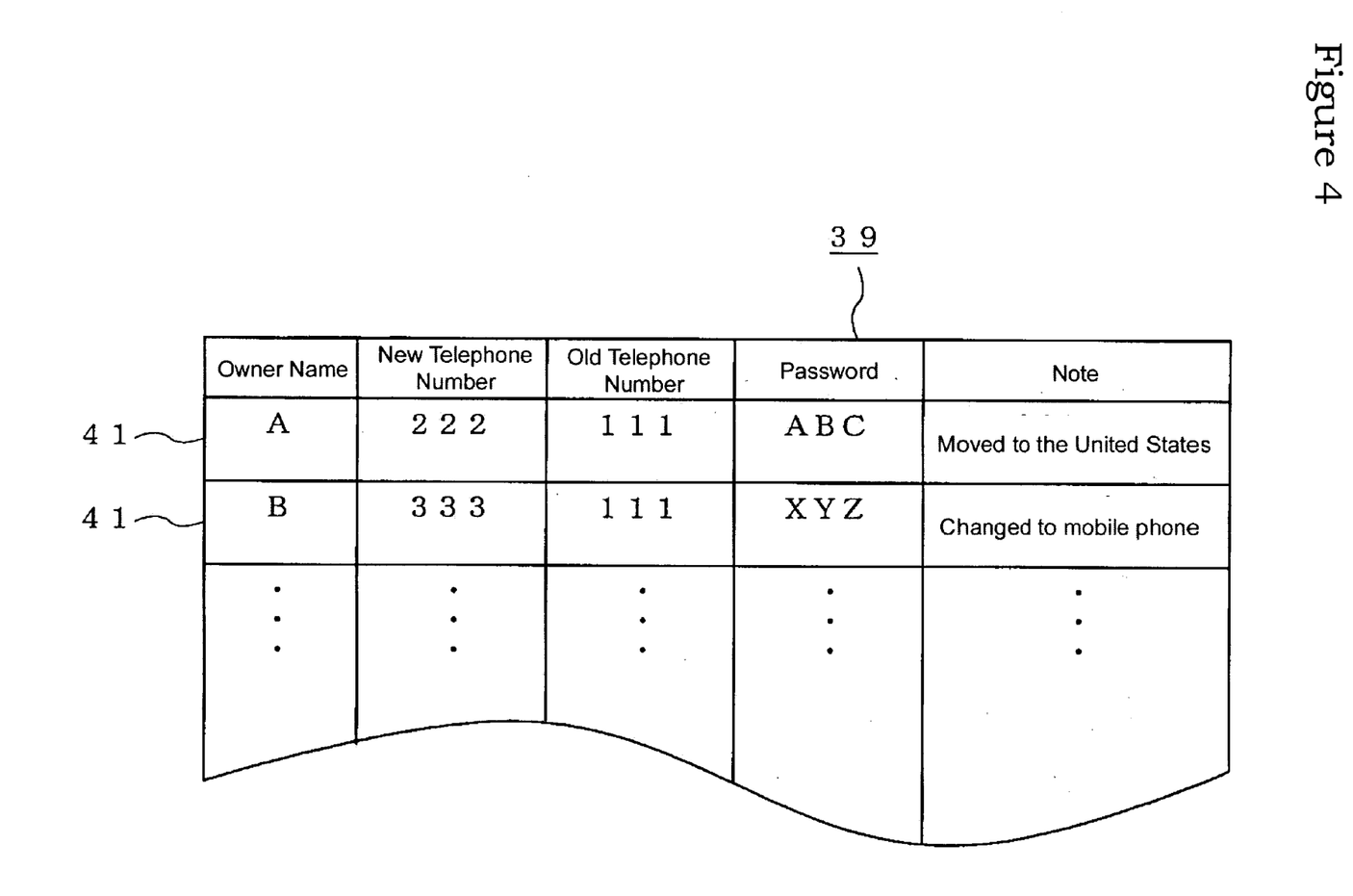
FIG. 4 shows the configuration of the database shown in FIG. 3

FIG. 4 is the configuration of the database. The database (39) can store multiple records (41) and each record, at a minimum, contains the old telephone number, new telephone number after relocation, owner name of the telephone numbers (registrant of the record), password, and note set by the user.

FIGS. 5 to 12 explain this system and transaction. A user of the system starts a Web browser program (23) on the terminal and connects with the server (3). The menu screen file is transferred from the server (3). The terminal (2) displays a menu screen file received from the server (3), using the web browser (23).

Figure 5:
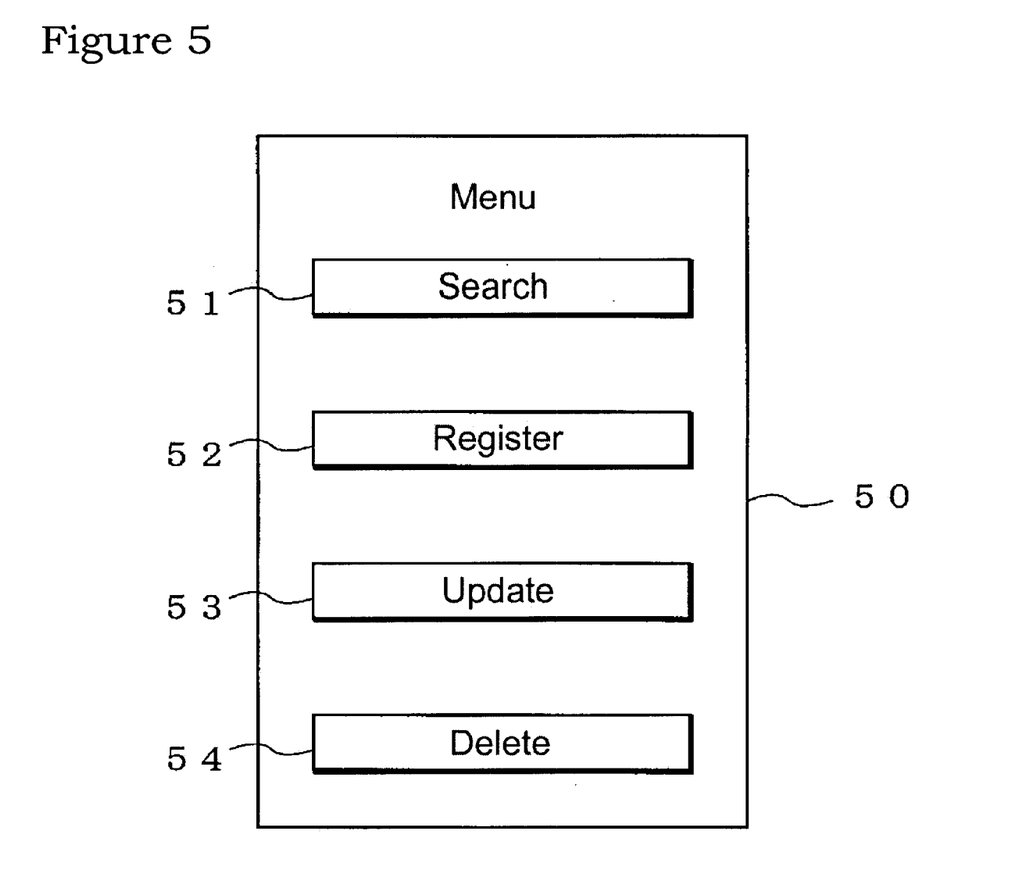
FIG. 5 shows a menu screen

FIG. 5 is an example of the menu. The menu (50) has four menu links such as "Search (51)", "Register (52)", "Update (53)", and "Delete (54)". A user clicks the respective menu button according to the operation. If the user searches the telephone number relocation information, click "Search", registers the telephone number relocation information, click "Register", updates the registration information, click "Update", or deletes the registration information, click "Delete". These operations are selected and clicked with a mouse (25). The following is an explanation of each item.

Figure 11:
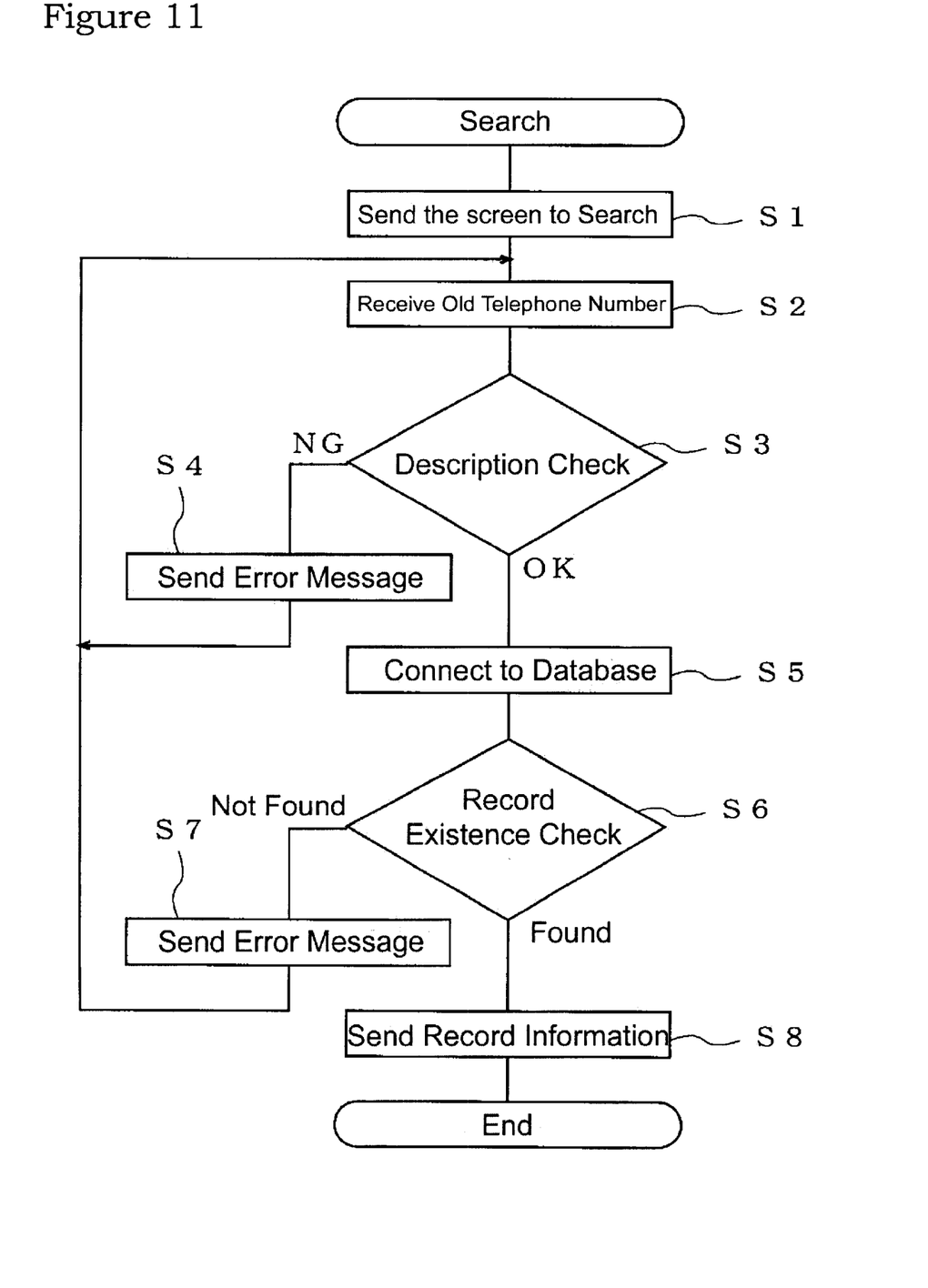
FIG. 11 shows a flowchart of the server search process

FIG. 11 shows the search flow of the CPU (31) of the server (3) in operation. This process takes place when the CPU (31) runs the telephone number relocation program (37). When the "Search" link is selected on the menu of the terminal (2), the CPU (31) sends the search screen file of the target link to the terminal (2) (S1). The terminal (2) displays the search screen on the browser.

Figure 6:
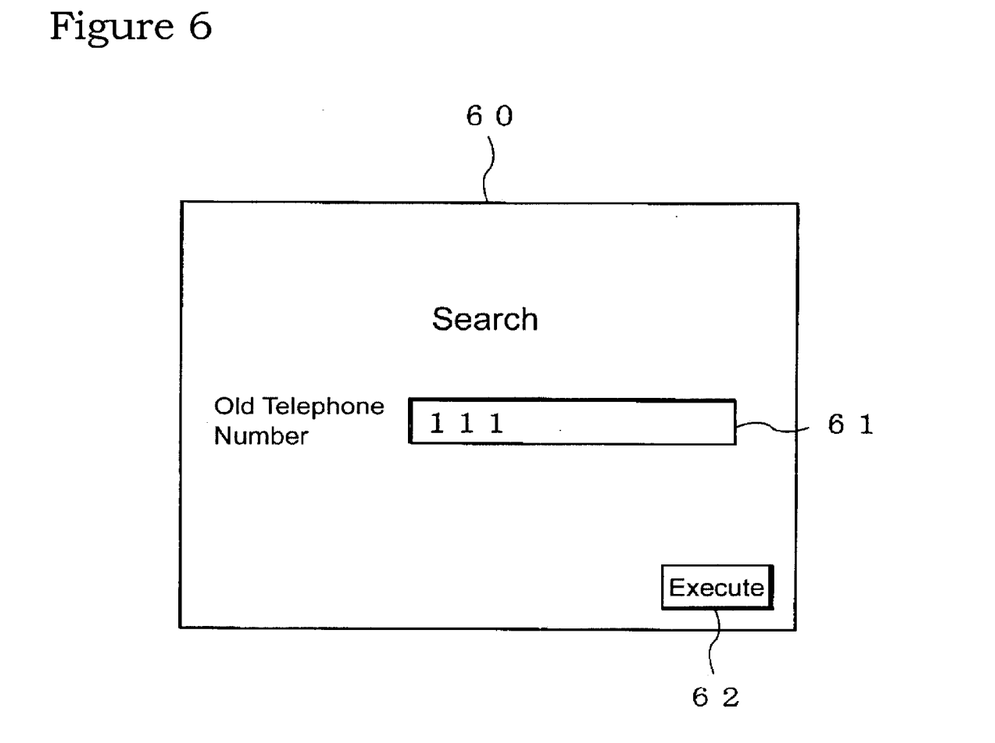
FIG. 6 shows a search screen
Figure 7:
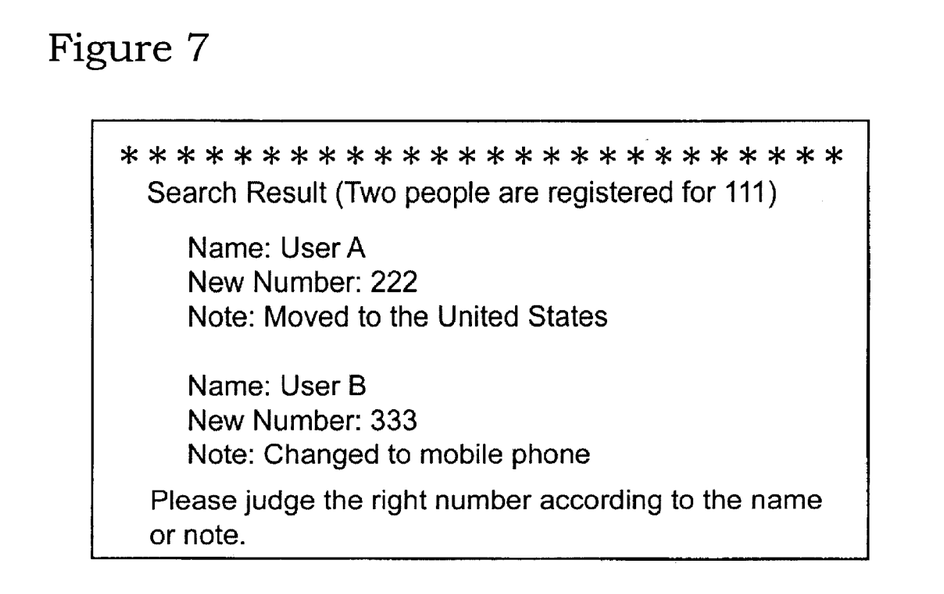
FIG. 7 shows an example of a search result

FIG. 6 is an example of a configuration for a search screen. The search screen (60) has an entry field for the old telephone number and Execute button (62). When a user wants to search the old telephone number, they input the number in the entry field (6) with the keyboard (12) and click the Execute button (62) with the mouse (25). When the Execute button (62) is clicked, the CPU (15) of the server (2) sends the entry of the old telephone number to the server (3).

When the CPU (31) of the server (3) receives information of the old telephone number (S2), it checks whether the information field is empty or not (S3) and sends an error message, "No Description" to the terminal (2) if an empty field is detected (S4). The terminal (2) shows the error message on the browser.

On the other hand, when there is no problem with the description of the old telephone number entry, the CPU (31) of the server (3) accesses the database (39) and searches the record that contains the old telephone number entry (S5).

If no record is found with the search (S6), an error message "No data found" is sent to the terminal and appears on the display (S7).

When a record is found with the search, the information of the record (without password) is sent to the terminal (2) and the search result appears (S8).

If multiple records are found with the search, the information from all of the records are sent to the terminal (2). If, for example, an old telephone number 111 is entered in the database shown in FIG. 4, two records (41, 41) are searched, however, the owner name of each record, new telephone number, and notes appear on the search result screen as shown in the FIG. 7. A user using the search function can confirm the telephone number from the owner name of the search result screen.

If, for example, the ownership of one telephone number is transferred from User A to User B, the same record with the old telephone number may appear. The existing NTT telephone number relocation guidance is not capable of handling such cases so NTT must limit the period of the telephone number relocation guidance service. However, the system of the invention does not face any problem even if the telephone number relocation guidance is provided without a limited period. In addition, a note is included with the record, a user knows the reason why the owner of the telephone changed the number.

Figure 12:
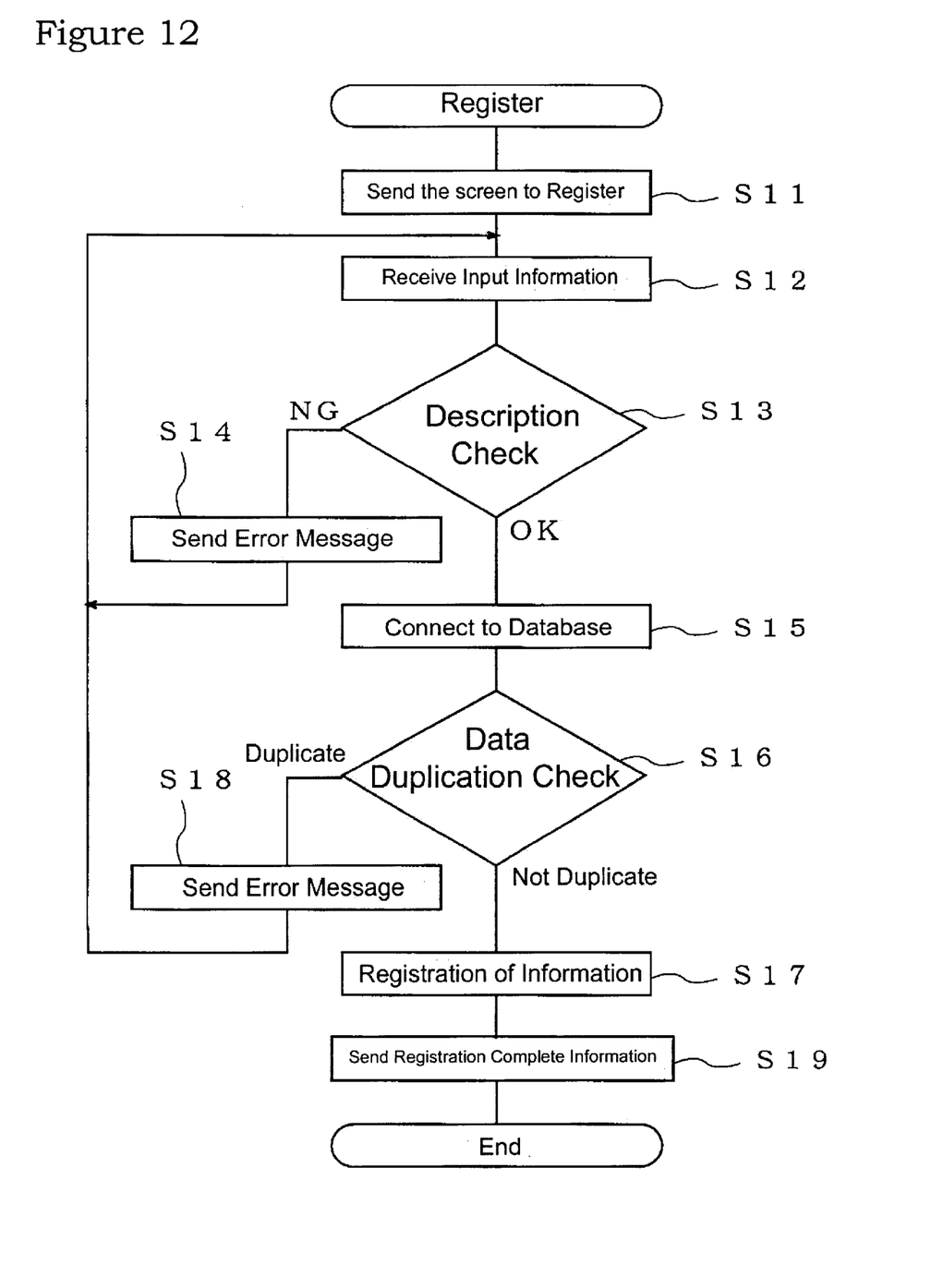
FIG. 12 shows a flowchart of the server registration process

FIG. 12 shows the registration flow chart that the CPU (31) of the server (3) executes. This process takes place when the CPU (31) runs the telephone number relocation program (37).

When the "Register" link is selected on the menu of the terminal (2), the CPU (31) sends the register screen file of the target link to the terminal (2) (S11). The terminal (2) displays the registration screen on the browser.

Figure 8:
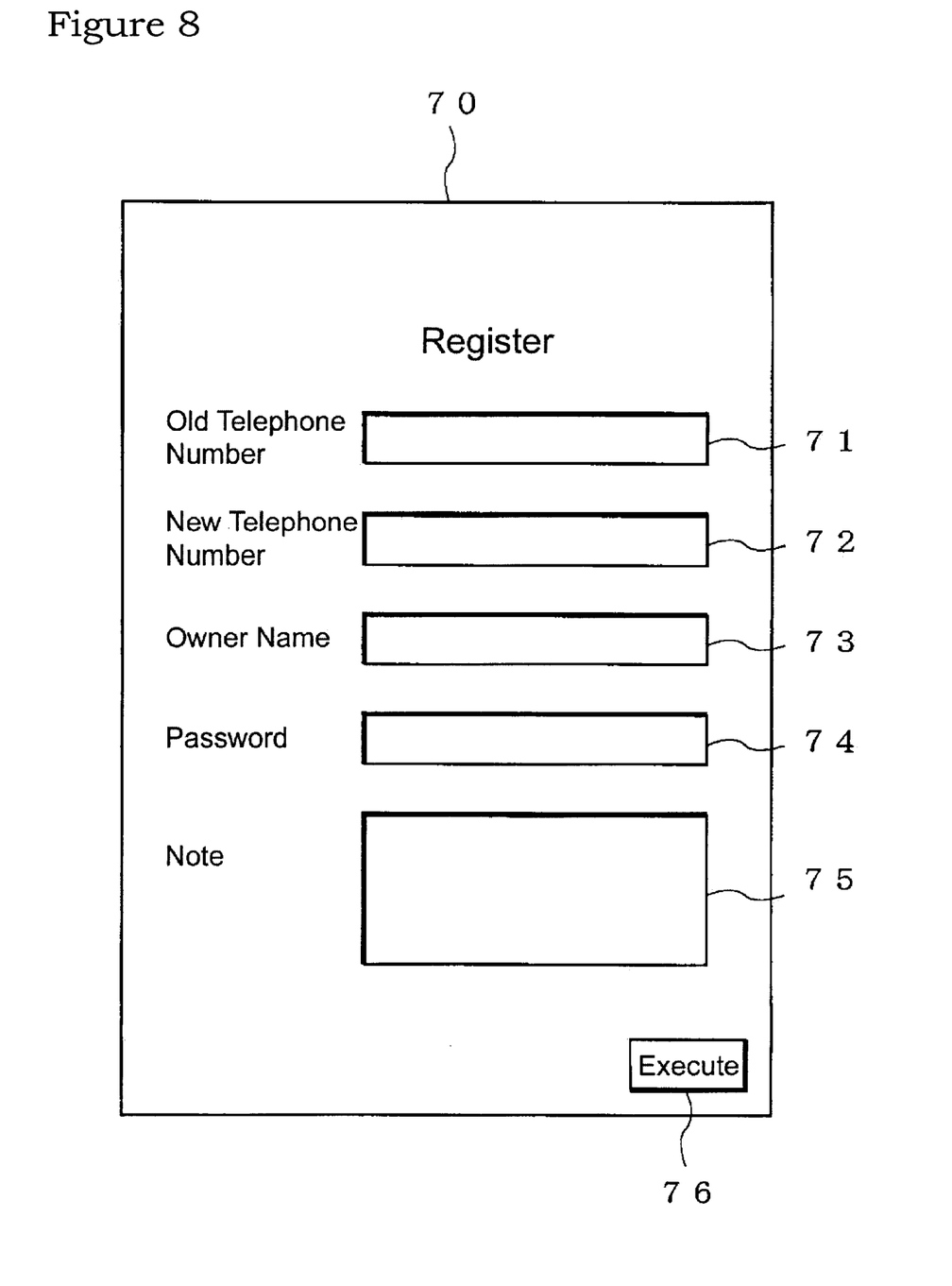
FIG. 8 shows the registration screen

FIG. 8 is an example of a registration screen. The register screen (70) has the entry field for the old telephone number (71), new telephone number after relocation (72), owner name of these telephone numbers (73), any password (74), note regarding telephone number relocation (75), and Execute button (62).

A user enters the information (registration information) in each entry field (71–75) with the keyboard (12) and clicks the Execute button (76) with the mouse (25). When the Execute button (76) is clicked, the CPU (15) of the terminal (2) sends the registration information entry to the server (3).

When the CPU (31) of the server (3) receives the registration information (S12), it checks whether the information field is empty or not (S13) and sends the error message "No description" to the terminal (2) if an empty field is detected (S14). However, no error message is returned even if the note field (75) is empty. The terminal (2) shows the error message received from the server (3) on the browser.

On the other hand, when there is no problem with the description of the registration information, the CPU (31) of the server (3) accesses the database (39) and judges if the registration information entry is not duplicated with the existing registration information record (S15, S16).

If a new telephone number and old telephone number of the newly entered registration information are duplicated with the existing record, it is assumed that the registration information is duplicated with the existing record information. In addition, if the new telephone number and password of the newly entered registration information are duplicated with the existing record, it is also assumed that the registration is duplicated with the existing record information.

As a result of this judgment, if the registration information is duplicated with the existing record information, the CPU (31) of the server (3) sends an error message "Data is duplicated" to the terminal (2) (S18). The terminal (2) that receives this error message displays this message on the browser.

If the registration information is not duplicated with the record information, the CPU (31) of the server (3) adds the registration information to the database (39) as a new record.

Since a user changing a telephone number can register their own telephone number to the database by themselves with this system, the staff of the telephone company does not have to register data under the current telephone number relocation guidance service and therefore the registration work load is reduced.

In addition, since the server (3) where the telephone number relocation information is registered is located on the Internet (1), anyone can access the server (3) and register their telephone number relocation information by themselves. Therefore, this system covers not only the land telephone circuits but also many other telephone terminals such as mobile phone, PHS, pagers, and other types of service providers, and provides several other telephone relocation guidance services uniformly for both domestic and international telephone number relocation, which is a very convenient telephone number relocation guidance system for users.

Figure 13:
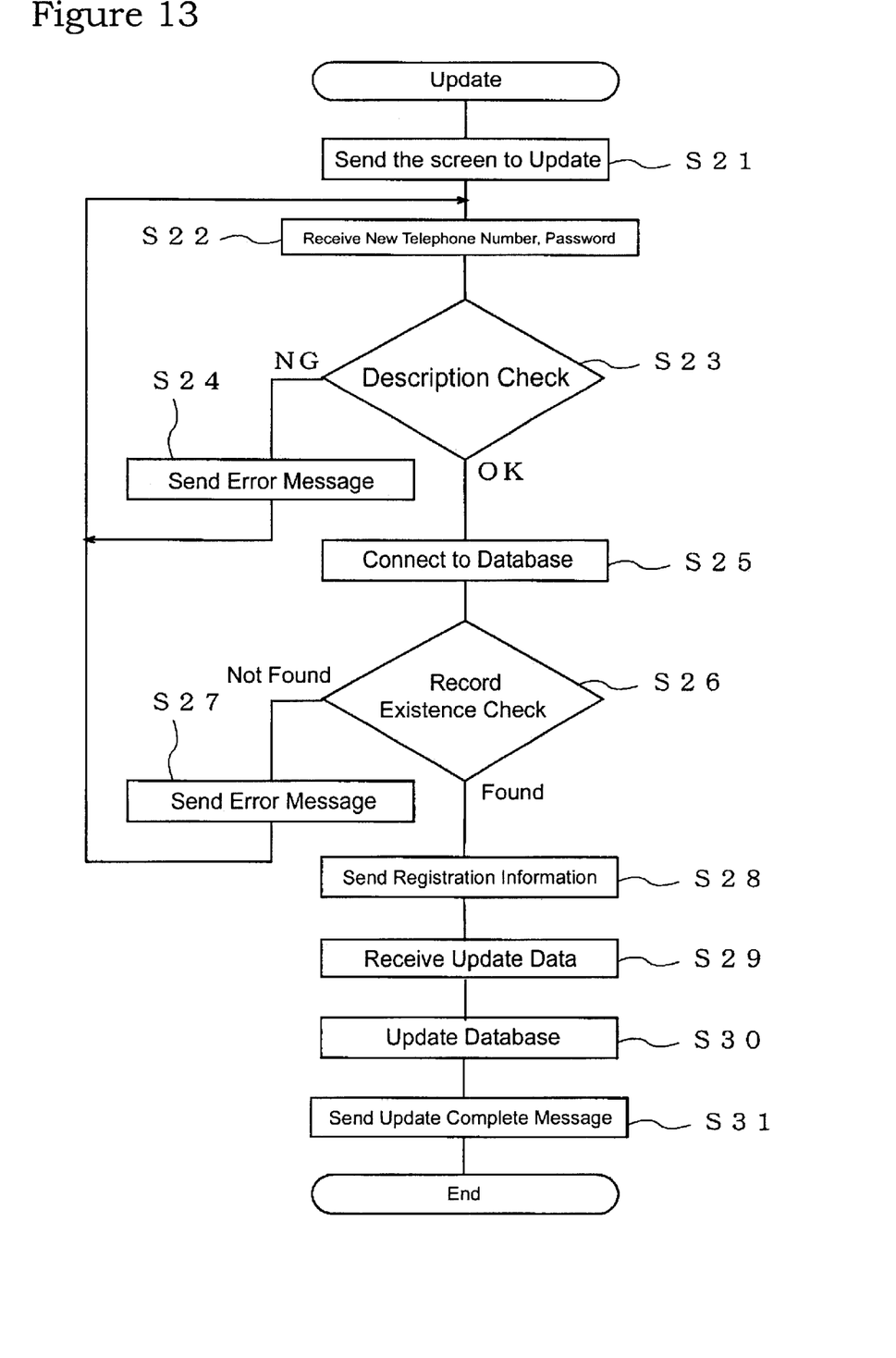
FIG. 13 shows a flowchart of the server update process

FIG. 13 shows the flow chart of the updating process that the CPU (31) of the server executes. This process is realized when the CPU (31) executes the Telephone number relocation guidance program (37).

When the link of "Update" on the menu of the terminal (2) is selected, CPU (31) sends the linked screen file for update to the terminal (2) (S21). The terminal (2) displays the screen for update on the browser.

Figure 9:
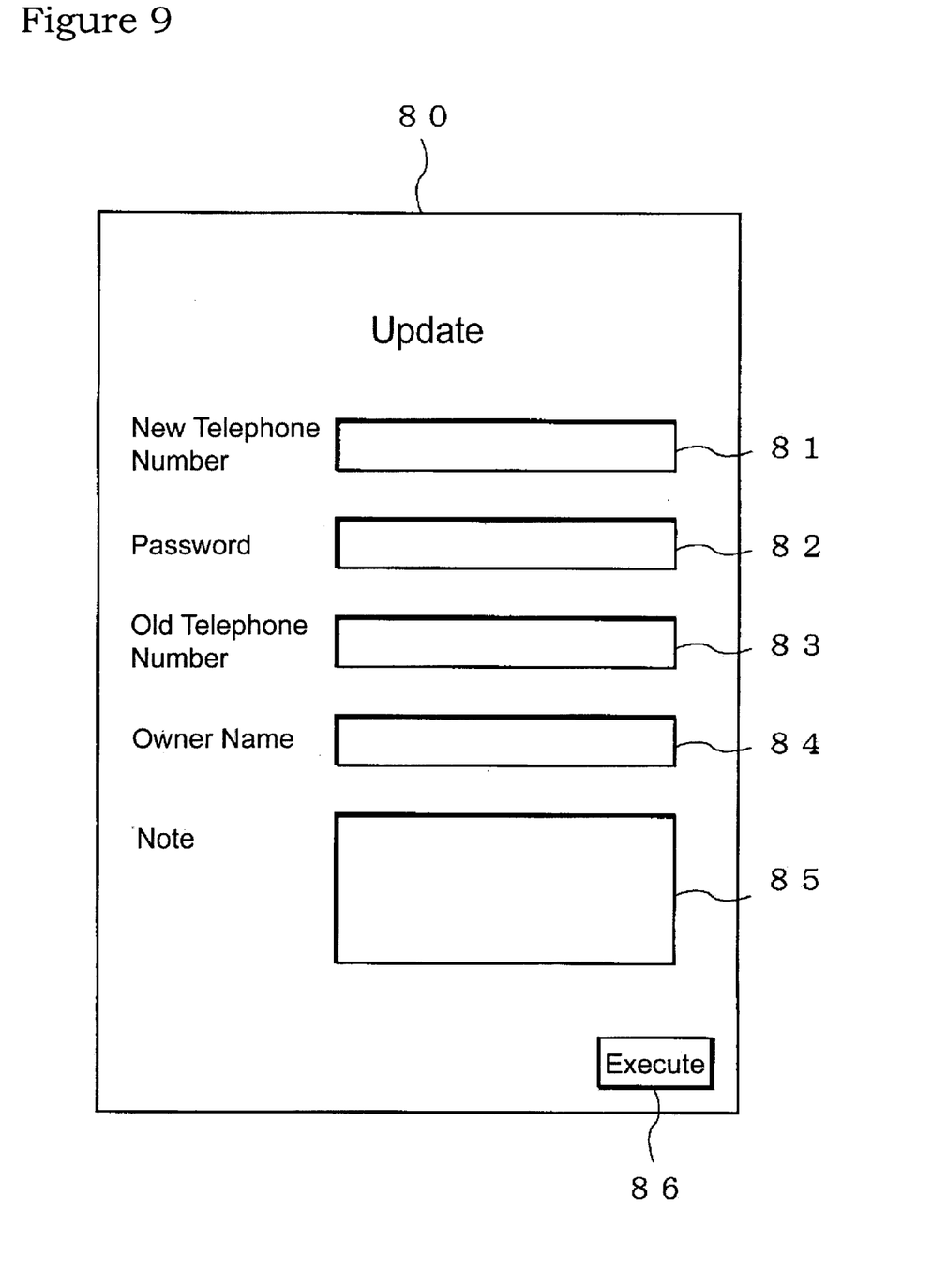
FIG. 9 shows an update screen

FIG. 9 shows an example of a configuration of the screen for update. The screen for update (80) has the entry field of a new telephone number for the registered telephone (81), entry field of password for the registered telephone (82), entry field of old telephone number (83), entry field of owner name (84), entry field for note (85), and Execute button for inquiry and update (86).

The user should input the registered information for the new telephone number entry field (81) and password entry field (82) from the keyboard (12), then click the Execute button (86) with the mouse (25). When the Execute button (86) is clicked, the CPU (15) of the terminal (2) sends the input new telephone number and password information (inquiry request information) to the server (3).

When the CPU (31) of the server (3) receives this inquiry request information (S22), it confirms that all entries are filled out (S23). If any empty field is found, the error message "Information has not been entered" is sent to the terminal (2) (S24). The terminal (2) shows this message on the browser.

When there is no problem with the received inquiry request information, the CPU (31) of the server (3) accesses the database (39) and searches for an inquiry request information matching with the record that contains the new telephone number and password (S25, S26). If no such record is found, an error mess age "No data found" is sent to the terminal (2) and displayed (S27).

If the matched record is found, the record is sent to the terminal (2), and the old telephone number, owner name, and note appears on the update screen (80) in the FIG. 9 (S28).

When the user confirms the information, it appears on the update screen (80), to select the item updated from the entry field from 81 to 85, and overwrites the information in the entry field. Overwriting the information should be done by keyboard (12). When data entry is completed, click the Execute button (86) with the mouse (25). The CPU (15) of the terminal (2) accepting this operation sends the updated data to the server (3). The CPU (15) of the server (3) which accepts this updated data overwrites the record (41) of the database (39) with the update data (S29, S30). The CPU (31) in which the record is overwritten sends an update completion message "Update is completed" to the terminal (2) and displays this message on the browser (S31).

In this way, the owner of the telephone number can simply update the existing record without adding a new record if they already registered their own record previously. For example, this is convenient when the note is changed later.

Figure 14:
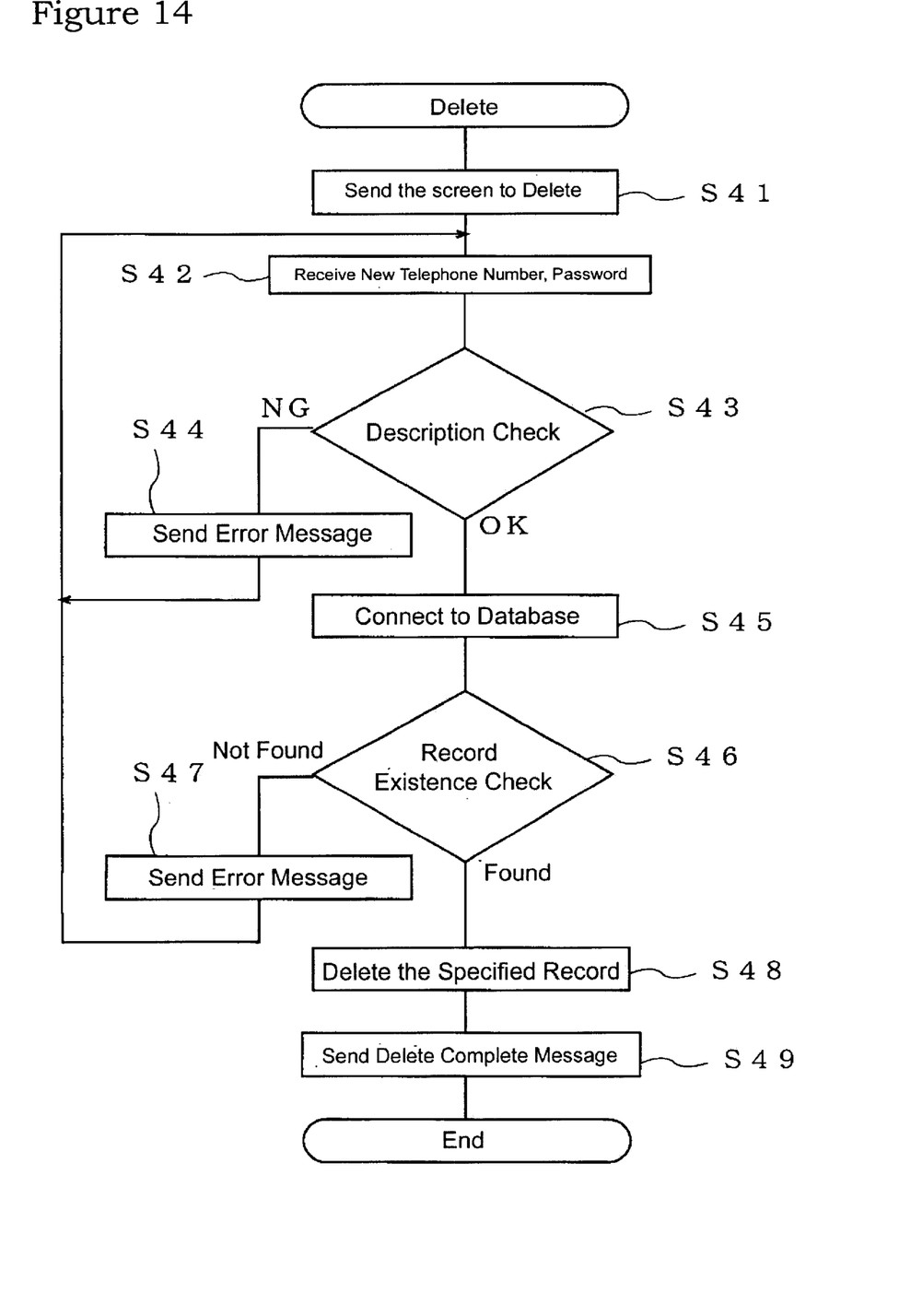
FIG. 14 shows a flowchart of the server delete process

FIG. 14 shows the flow of the deletion process that the CPU (31) of the server executes. This process is realized when the CPU (31) executes the Telephone number relocation guidance program (37).

Figure 10:
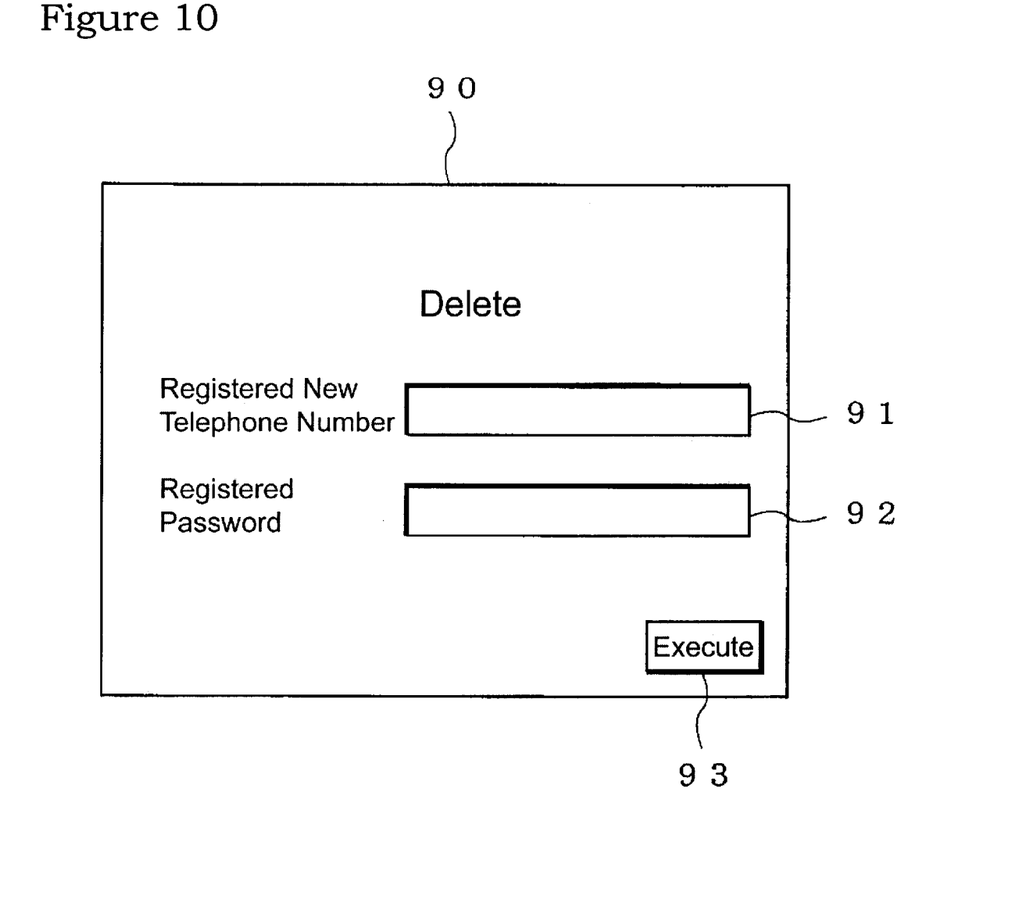
FIG. 10 shows a delete screen

When the link of "Delete" on the menu of the terminal (2) is selected, the CPU (31) sends the linked screen file for deletion to the terminal (2) (S41). The terminal (2) displays the screen for deletion on the browser. FIG. 10 shows a configuration sample of the screen for deletion. The screen (90) for deletion has an entry field (91) of a new telephone number for the registered telephone, entry field (92) for the password for the registered telephone, and the execute button (93) for deletion.

A user should input the registered information in the new telephone number entry field (91) and password entry field (92) from the keyboard (12), then click the Execute button (93) with the mouse (25). When the Execute button (93) is clicked, the CPU (15) of the terminal (2) sends the input new telephone number and password information (deletion request information) to the server (3).

When the CPU (31) of the server (3) receives this deletion request information (S42), it confirms that all entries are filled out. If any empty field is found, an error message indicating "Information has not been entered" is sent to the terminal (2) (S44). The terminal (2) shows this message on the browser.

When there is no problem with the inquiry request received, the CPU (31) of the server (3) accesses to the database (39) and searches for the deletion request information matching with the record that contains the new telephone number and password (S45, S46). If such record is not found, an error message "No data found" is sent to the terminal (2) and displayed (S47).

If the matching record is found, the CPU (31) deletes the record from the database (39) (S48) and sends a deletion completion message "Deletion is completed" to the terminal (2) and displays it on a browser (S49).

The server (3) keeps the registered or updated date of each record and may delete the expired record automatically when the specified time elapses from the registration or update of the record effective period. Deleting less useful records allows a user to utilize the file device in an effective manner and minimize the record search time to access the database so more quick service can be provided.

Optionally, a user can count the number of accesses in a specified period of each record and if the access number is below the threshold and such condition continues for a certain period, the record may be deleted. In this way, only the records that are less important are deleted.

The screen files of the search screen and registration screen that are sent from the server (3) to the terminal (2) can be HTML format files. The file sent from the server (3) to the terminal (2) may be in any format stored on the HD of the server (3) or a file generated during the execution process of the Telephone number relocation guidance program (37).

In addition, this invention does not limit the above mentioned execution types. For instance, the information in the record is not necessarily the owner name equals the registered name so that the user can use a handle name as long as the user is identified.

Since this invention is configured and functioned as mentioned above, each record in the database has the information of the new telephone number, old telephone number and owner of the telephone. Each of these information can be searched from the above mentioned database of the server from any terminal on the Internet. When the old telephone number is input from the terminal, the server searches the matching record and displays both the old telephone number, its corresponding new telephone number and owner on the terminal. If there is more than one record that is identical with the old telephone number, the new number can be found by the name of the owner. Therefore, the telephone number relocation guidance can be used without limitation. If this system is configured on the Internet, the system can be used from any place in the world.

If a user chooses the registration method of his own telephone number relocation information to the database of the server in the Internet, the telephone number relocation guidance of mobile phone, PHS, and pager can be controlled uniformly and guidance can be provided. At the same time, not only the domestic telephone number but also overseas telephone number relocation guidance can be controlled and guidance is given. This system provides outstanding feature of the telephone number relocation.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A telephone number relocation guidance system comprising
   a) a server connected to a global computer network, the server comprising:
      i) a central processing unit having memory;
      ii) a data storage device coupled to the central processing unit, such that the central processing unit reads data from and writes data to the data storage device under control of a program in memory;
      iii) a network connection coupled to the central processing unit and the global computer network, such that the central processing unit reads data from and writes data to a terminal over the global communications network under control of a program in memory;
   b) a database residing on the data storage device, comprising a plurality of records, each record comprising at least an old telephone number and a corresponding new telephone number and a name of an owner of the old and new telephone numbers;
   the database being capable of storing a plurality of records for an old telephone number, such that a single old telephone number may have a plurality of corresponding records for new telephone numbers and names of owners;
   the program in the memory of the central processing unit being programmed such that, in response to data received from a terminal over the global computer network, the server searches the database for an old telephone number and writes the data from the records for the old telephone number to the terminal over the global computer network, the data comprising at least one corresponding new telephone number and owner name from the database.

2. The telephone number relocation system of claim 1, in which the program controlling the central processing unit is programmed such that the records in the database can be added, updated or deleted in response to data received from the terminal over the global computer network.

3. The telephone number relocation system of claim 2, in which:
   each record in the database further comprises a password; and
   the program controlling the central processing unit is programmed such that the central processing unit will not change or delete a record unless a password is supplied by the terminal which matches the password in the record.

4. The telephone number relocation system of claim 1, in which each record in the database further comprises a note.

5. The telephone number relocation system of claim 1, in which the terminal is running a web browser program, and the server communicates with the terminal using hypertext markup language.

6. The telephone number relocation system of claim 1, in which the telephone numbers in the database are selected from the group comprising land telephone numbers, mobile telephone numbers, PHS and pagers.

7. The telephone number relocation system of claim 1, in which each record in the database further comprises a date, and the server writes a date updated in the date on the record when the record is created or updated.

8. The telephone number relocation system of claim 7, in which the server deletes records having a date older than a selected date.

9. The telephone number relocation system of claim 7, in which each record in the database further comprises a count of accesses, and the server increments the count of accesses in the record when the record is accessed.

10. The telephone number relocation system of claim 9, in which the server deletes records having a count of accesses which is less than a selected number.

11. A method of providing information from a server to a terminal over a global computer network, the information concerning changes from old telephone numbers to new telephone numbers, comprising the steps of:
   a) providing a database comprising a plurality of records, each record comprising at least an old telephone number and a corresponding new telephone number and a name of an owner of the old and new telephone numbers, the database being capable of storing a plurality of records for an old telephone number, such that a single old telephone number may have a plurality of corresponding records for new telephone numbers and names of owners;
   b) accepting data at the server from a terminal over the global computer network, the data comprising at least an old telephone number;
   c) searching the database for the old telephone number; and
   d) writing the data from the records for the old telephone number from the database to the terminal over the global computer network, the data comprising at least one corresponding new telephone number and owner name.

12. The method of claim 11, further comprising the steps of
   e) accepting command data from the terminal over the global computer network; and
   f) adding, updating and deleting records from the database in response to the command data received from the terminal over the global computer network.

13. The method of claim 11, in which:
   each record in the database further comprises a password; and
   the method further comprises the steps of:
      requiring a password as part of the command data;
      comparing the password from the command data to the password in the record in the database; and
      changing or deleting a record only if the password supplied by the terminal matches the password in the record.

14. The method of claim 11, in which the terminal is running a web browser program, and the server communicates with the terminal using hypertext markup language.

15. The method of claim 11, in which the telephone numbers in the database are selected from the group comprising land telephone numbers, mobile telephone numbers, PHS and pagers.

16. The method of claim 11, in which each record in the database further comprises a date, and the method further comprises the step of writing a date updated in the date on the record when the record is created or updated.

17. The method of claim 16, further comprising the step of deleting records having a date older than a selected date.

18. The method of claim 17, in which each record in the database further comprises a count of accesses, and the method further comprises the step of incrementing the count of accesses in the record when the record is accessed.

19. The method of claim 18, further comprising the step of deleting records having a count of accesses which is less than a selected number.

* * * * *